United States Patent
Lighty et al.

(10) Patent No.: US 11,702,976 B2
(45) Date of Patent: Jul. 18, 2023

(54) VAPOR LEAK PRESSURE RELIEF AND DIVERSION SYSTEM

(71) Applicant: Rolls-Royce North American Technologies Inc., Indianapolis, IN (US)

(72) Inventors: Kerry J. Lighty, Plainfield, IN (US); Paul O'Meallie, Brownsburg, IN (US); Sean Morgan, Indianapolis, IN (US); Alan W. Smith, Greenwood, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 407 days.

(21) Appl. No.: 16/822,860

(22) Filed: Mar. 18, 2020

(65) Prior Publication Data

US 2021/0293174 A1    Sep. 23, 2021

(51) Int. Cl.
*F01P 3/22* (2006.01)
*F01P 11/02* (2006.01)

(52) U.S. Cl.
CPC ......... *F01P 3/2271* (2013.01); *F01P 11/0238* (2013.01)

(58) Field of Classification Search
CPC ..... F01P 3/2271; F01P 11/0238; H02K 9/193; B64D 2013/0674
USPC ...................................................... 123/41.54
See application file for complete search history.

(56) References Cited

U.S. PATENT DOCUMENTS

| | | | |
|---|---|---|---|
| 4,753,284 A | 6/1988 | Krause et al. | |
| 4,959,569 A | 9/1990 | Snuttjer et al. | |
| 5,507,150 A * | 4/1996 | Weber | F25B 19/00 62/169 |
| 6,098,412 A | 8/2000 | Porter et al. | |
| 6,424,062 B1 | 7/2002 | Adelmann et al. | |
| 6,720,685 B2 | 4/2004 | Balas | |
| 6,866,092 B1 | 3/2005 | Molivadas | |
| 7,633,193 B2 | 12/2009 | Masoudipour et al. | |
| 9,243,820 B2 * | 1/2016 | Park | F25B 25/02 |
| 10,161,683 B2 | 12/2018 | Singh et al. | |
| 10,348,162 B1 | 7/2019 | Huang et al. | |
| 10,365,022 B2 | 7/2019 | Goel et al. | |
| 2011/0058637 A1 * | 3/2011 | Campbell | F28D 15/00 376/361 |

(Continued)

FOREIGN PATENT DOCUMENTS

| | | |
|---|---|---|
| EP | 2413056 A1 | 2/2012 |
| WO | 2012139216 A1 | 10/2012 |
| WO | 2017143018 A1 | 8/2017 |

OTHER PUBLICATIONS

French Search Report completed on Aug. 26, 2022 and issued in connection with French Patent Application No. FR2102498, 8 pages.

*Primary Examiner* — Lindsay M Low
*Assistant Examiner* — Omar Morales
(74) *Attorney, Agent, or Firm* — Barnes & Thornburg LLP

(57) ABSTRACT

A cooling system includes a first cooling loop, a second cooling loop and a heat exchanger configured to transfer heat from the first cooling loop to the second cooling loop. The first cooling loop includes a flow restrictor, an inertial separator, and a pressure relief valve cooperating to effect diversion of vapor present in the first cooling loop due to a leak between the first cooling loop and the second cooling loop.

16 Claims, 3 Drawing Sheets

(56) References Cited

U.S. PATENT DOCUMENTS

2014/0345312 A1\* 11/2014 Katoh ...................... F28D 1/04
62/277

\* cited by examiner

VAPOR LEAK PRESSURE RELIEF AND DIVERSION SYSTEM

FIELD OF THE DISCLOSURE

The present disclosure relates generally to cooling systems for aerospace applicants, and more specifically to a cooling system including a vapor diversion system for diverting vapor that may appear in the cooling system as a result of a coolant leak.

BACKGROUND

Cooling systems are used in aerospace applications to remove heat from heat sources, for example, motors, generators, and other components that generate heat when operated. Such cooling systems typically include a cooling loop having a heat source; a working fluid or coolant configured to receive heat from the heat source; a heat exchanger configured to receive heat from the heated coolant and to reject the heat from the cooling system; a coolant pump configured to move the coolant; and a fluid conduit fluidly coupling the heat source, the heat exchanger, and the coolant pump, thereby enabling the coolant pump to move the coolant from the coolant pump to the heat source, from the heat source to the heat exchanger, and from the heat exchanger back to the pump.

In some cooling systems, the heat exchanger rejects heat directly to an environment surrounding the first cooling loop. In some other cooling systems, the heat exchanger rejects heat to a second cooling loop, which in turn rejects the heat to the environment. Such systems may use a first working fluid or coolant in the first cooling loop and a second working fluid or coolant in the second system, wherein the first coolant is better suited than the second coolant for transferring heat from the first heat source, and wherein the second coolant is better suited than the first coolant for transferring heat to the environment.

SUMMARY

The present disclosure may comprise one or more of the following features and combinations thereof.

According to an aspect of the present disclosure, a cooling system having a vapor leak diversion system includes a first sealed cooling loop, a second sealed cooling loop, and a heat exchanger in fluid communication with the first sealed cooling loop and the second sealed cooling loop, and configured to exchange heat between the first sealed cooling loop and the second sealed cooling loop.

The first sealed cooling loop is configured to operate at a first nominal working pressure. The first sealed cooling loop includes a heat source, a pump, a first fluid conduit, and a first coolant configured to circulate through the first fluid conduit. The first coolant is a liquid at the first nominal working pressure.

The first sealed cooling loop also includes a coolant tank in fluid communication with a low-pressure side of the first sealed cooling loop. The coolant tank has a gas space configured to hold gas and a liquid space configured to hold a portion of the first coolant. An inertial separator is located between the heat exchanger and the heat source, and configured to separate vapor from the first coolant. A flow restrictor is located between the inertial separator and the heat source. A heat source bypass pressure relief valve has an inlet in fluid communication with the inertial liquid and vapor separator and an outlet in fluid communication with the coolant tank. The heat source bypass pressure relief valve is configured to open when a differential pressure between the inlet and the outlet of the heat source bypass pressure relief valve exceeds a first predetermined value The second sealed cooling loop is configured to operate at a second nominal working pressure greater than the first nominal working pressure. The second sealed cooling loop includes a second fluid conduit and a second coolant configured to circulate through the second fluid conduit. At least a portion of the second coolant is a liquid at the second nominal working pressure and is a vapor at the first nominal working pressure.

The presence of vapor in the first fluid conduit between the heat exchanger and the flow restrictor may result in an increase in the differential pressure between the inlet and the outlet of the heat source bypass pressure relief valve greater than the predetermined value. Should this occur, the heat source bypass pressure relief valve may open. With the heat source bypass pressure relief valve, the inertial separator may direct the first coolant to the heat source and divert the vapor to the coolant tank. In some embodiments, the inertial separator is a T-junction in the first fluid conduit.

In some embodiments, the second sealed cooling loop is a two-phase cooling loop, and the second coolant is a two-phase fluid at the second nominal working pressure.

Some embodiments may include a tank pressure relief valve having an inlet in fluid communication with the gas space of the coolant tank, wherein the tank pressure relief valve is configured to open when a differential pressure between the inlet and the outlet of the tank pressure relief valve exceeds a second predetermined value, wherein the second predetermined value is greater than the first predetermined value. The tank pressure relief valve may have an outlet in fluid communication with a capture vessel. The capture vessel may be an expandable vessel. Some embodiments may include a vent system configured to vent the capture vessel if the pressure inside the capture vessel exceeds a predetermined value.

Some embodiments may include a pressure sensor configured to detect and output a signal indicative of pressure in the first sealed cooling loop, and a controller configured to receive the signal and to regulate the operation of the heat source to reduce heat input to the first coolant when the pressure in the first sealed cooling loop exceeds a threshold value.

In another aspect of the present disclosure, a cooling system having a vapor leak diversion system includes a first sealed cooling loop including a first coolant, a second sealed cooling loop including a second coolant, and a heat exchanger in fluid communication with the first fluid conduit and the second fluid conduit and configured to exchange heat between the first coolant and to the second coolant The first sealed cooling loop includes a first fluid conduit, the first coolant, a pump configured to move the first coolant through the first fluid conduit, and a heat source configured to transfer heat to the first coolant. The second sealed cooling loop includes a second fluid conduit and the second coolant.

A working pressure and temperature of the first sealed cooling loop is such that the first coolant is in a liquid state in the first sealed cooling loop. A working pressure and temperature of the second sealed cooling loop is such that the second coolant is in a liquid state in the second sealed cooling loop. The second coolant is configured to change from the liquid state to a vapor state if the second coolant enters the first sealed cooling loop.

The first sealed cooling loop further includes a flow restrictor fluidly connected downstream of the heat exchanger and upstream of the heat source, and an inertial separator fluidly connected downstream of the heat exchanger and upstream of the flow restrictor. The inertial separator is configured to separate vaporized second coolant located in the first sealed cooling loop from the first coolant in response to the vaporized second coolant located in the first fluid conduit interacting with the flow restrictor to cause a differential pressure in the first sealed cooling loop between an upstream side of the heat source and a downstream side of the heat source to exceed a predetermined value.

In some embodiments, the cooling system includes a pressure relief valve having an inlet in fluid communication with the inertial separator and an outlet in fluid communication with the first fluid conduit downstream of the heat source and upstream of the heat exchanger.

In some embodiments, the cooling system includes a coolant tank in fluid communication with the first fluid conduit downstream of the heat source and upstream of the heat exchanger. The coolant tank defines a gas space configured to hold gas and a liquid space configured to hold the first coolant, wherein the outlet of the pressure relief valve is fluidly coupled to the gas space.

In some embodiments, the cooling system includes a pressure relief valve having an inlet fluidly coupled to the gas space and an outlet fluidly coupled to an environment. The pressure relief valve has an outlet that may be fluidly coupled to a capture vessel.

In some embodiments, the cooling system includes a pressure sensor configured to detect and output a signal indicative of pressure in the first sealed cooling loop, and a controller configured to receive the signal and to output a signal indicative of a leak in the second sealed cooling loop if the pressure in the first sealed cooling loop exceeds a threshold value.

In yet another aspect of the present disclosure, a method for separating vapor from liquid in a cooling system including providing a first sealed cooling loop including a first conduit, a first coolant, a pump configured to move the first coolant through the first conduit, and a heat source configured to transfer heat to the first coolant, wherein a working pressure and temperature of the first sealed cooling loop is such that the first coolant is in a liquid state in the first sealed cooling loop.

The method also includes providing a second sealed cooling loop that includes second conduit and a second coolant configured to move through the second conduit, wherein a working pressure and temperature of the second coolant cooling loop is such that the second coolant is in a liquid state in the second sealed cooling loop, and wherein the second coolant is configured to change state from the liquid state to a vapor state if the second coolant enters the first sealed cooling loop; providing a heat exchanger in fluid communication with the first conduit and the second conduit and configured to exchange heat between the first coolant and the second coolant.

The method further includes providing a flow restrictor fluidly connected downstream of the heat exchanger and upstream of the heat source; providing an inertial separator fluidly connected downstream of the heat exchanger and upstream of the flow restrictor.

The method still further includes providing a pressure relief valve having an inlet in fluid communication with the inertial separator and an outlet in fluid communication with the first conduit downstream of the heat source and upstream of the heat exchanger.

The method also includes configuring the pressure relief valve to close when a differential pressure in the first sealed cooling loop between an upstream side of the heat source and a downstream side of the heat source is less than a predetermined value, and to open and thereby cause the inertial separator to separate vaporized second coolant located in the first sealed cooling loop from the first coolant when the vaporized second coolant located in the first conduit interacts with the flow restrictor to cause the differential pressure in the first sealed cooling loop between an upstream side of the heat source and a downstream side of the heat source to equal or exceed the predetermined value.

In some embodiments, the method includes providing a coolant tank in fluid communication with the first conduit downstream of the heat source and upstream of the heat exchanger monitoring a pressure, the coolant tank, the coolant tank defining a gas space configured to hold gas and a liquid space configured to hold the first coolant, wherein the outlet of the pressure relief valve is fluidly coupled to the gas space.

In some embodiments, the method includes providing a second pressure relief valve having an inlet fluidly coupled to the gas space and an outlet fluidly coupled to a capture vessel or an environment.

In some embodiments, the method Includes providing a pressure sensor configured to detect and output a signal indicative of pressure in the first sealed cooling loop, and providing a controller configured to regulate the operation of the heat source when the pressure in the first sealed cooling loop exceeds a threshold value.

These and other features of the present disclosure will become more apparent from the following description of the illustrative embodiments.

DETAILED DESCRIPTION OF THE DRAWINGS

Figure 1:
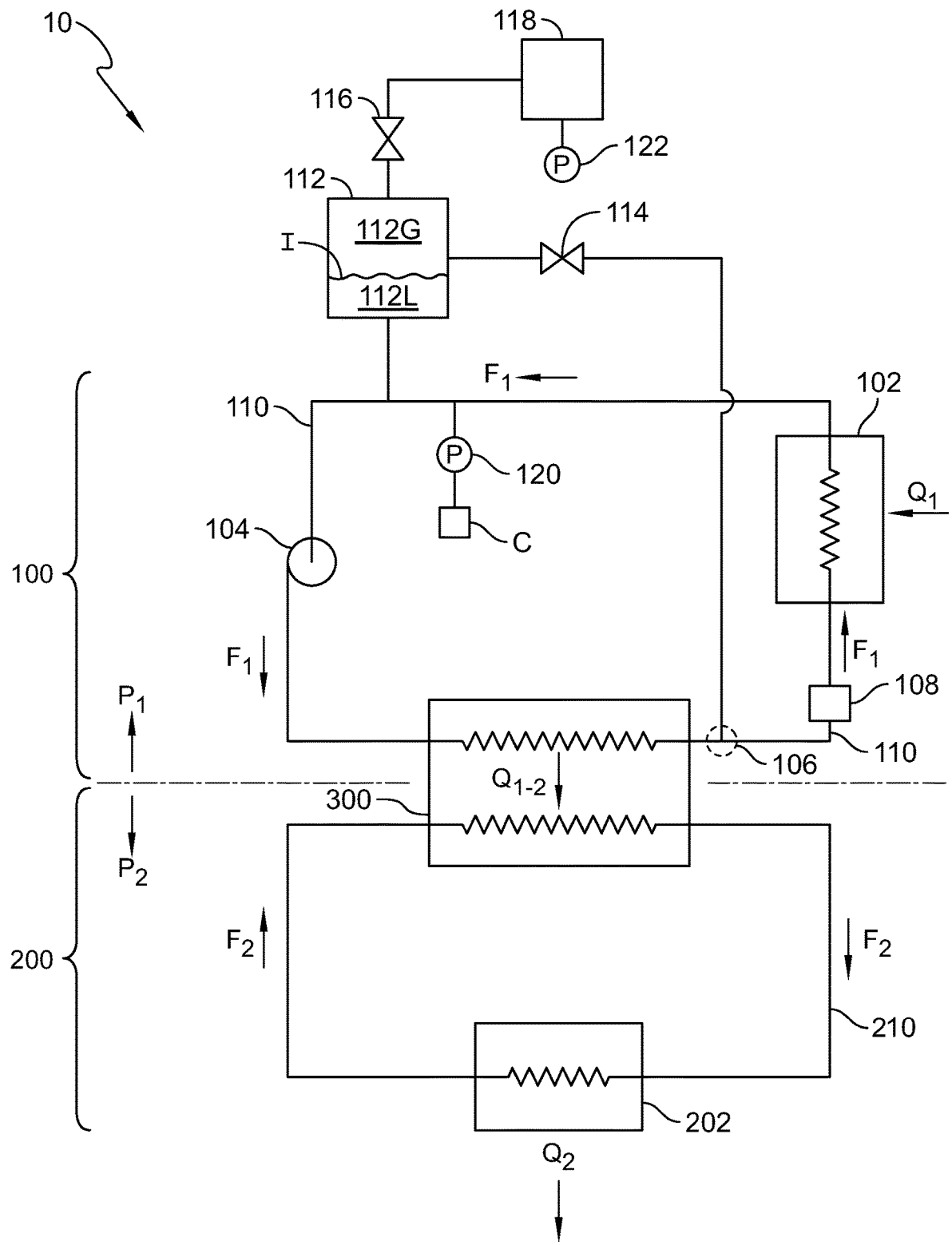
FIG. 1 is a diagrammatic view of a cooling system including a first cooling loop operating at a first nominal temperature and pressure and using a first coolant as a working fluid, a second cooling loop operating at a second nominal temperature and pressure and using a second coolant as a working fluid, a heat exchanger configured to exchange heat between the first cooling loop and the second cooling loop, and a vapor leak diversion system for separating second coolant vapor that may be present in the first cooling loop from the first coolant according to the present disclosure.

For the purposes of promoting an understanding of the principles of the disclosure, reference will now be made to a number of illustrative embodiments illustrated in the drawings and specific language will be used to describe the same.

Figure 2:
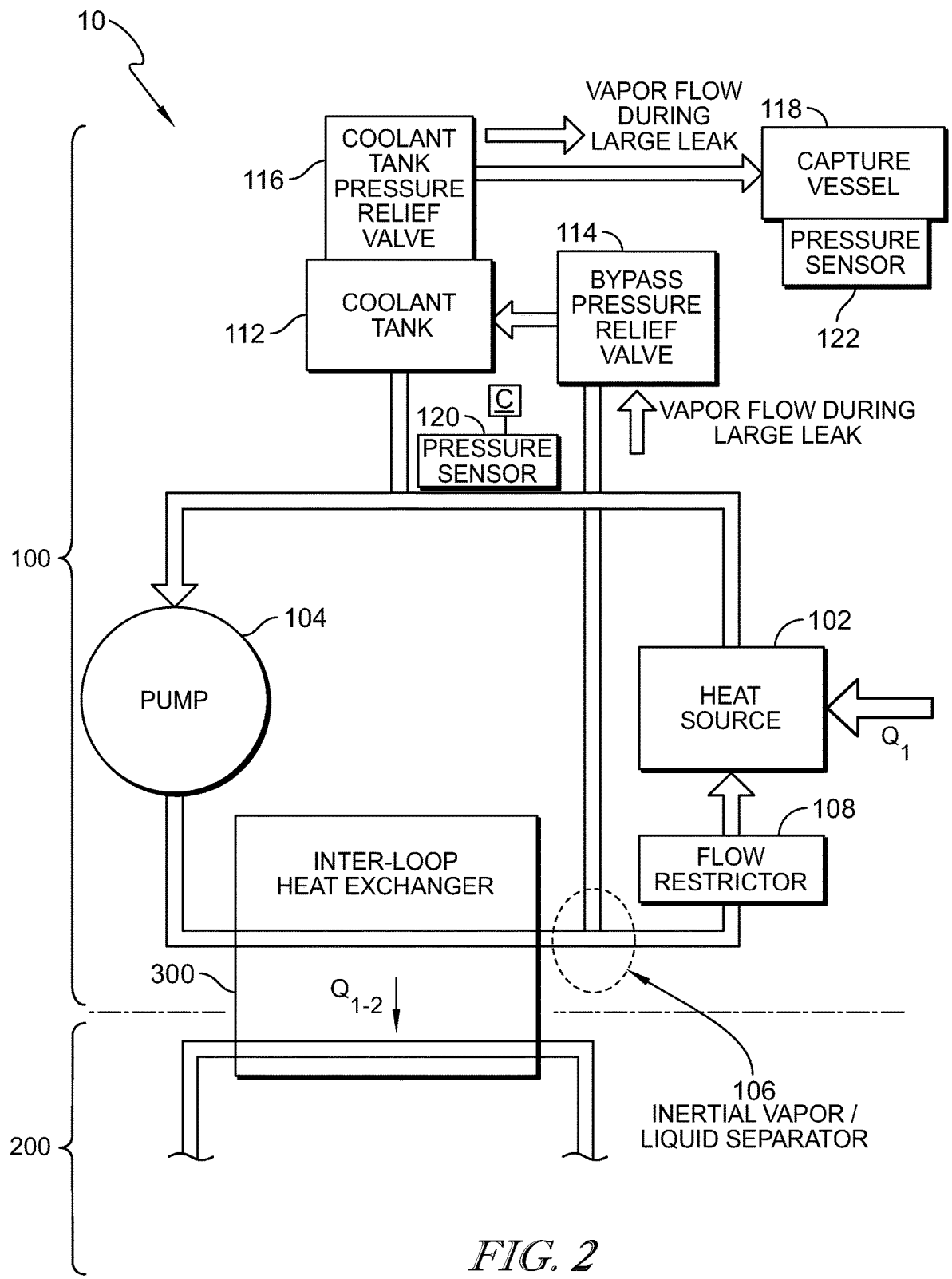
FIG. 2 is a schematic view of a portion of the cooling system of FIG. 1.

FIGS. 1 and 2 show an illustrative cooling system 10 according to the present disclosure. The cooling system 10 includes a first cooling loop 100 using a first coolant as a working fluid. The first coolant may be, for example and without limitation, oil (for example, transformer oil), water, glycol, a water/glycol mixture, aviation fuel, or another suitable coolant. The cooling system 10 also includes a second cooling loop 200 using a second coolant as a working fluid. The second coolant may be, for example, and without limitation, a refrigerant (for example, R134), aviation fuel, compressed air or pressurized gas, or another suitable coolant. The cooling system 10 further includes a heat exchanger 300 having a first side in fluid communication with the first cooling loop 100 and a second side in fluid communication with the second cooling loop 200 so that the heat exchanger 300 may exchange heat between the first sealed cooling loop 100 and the second sealed cooling loop 200. In the embodiment shown, the heat exchanger 300 is configured to transfer heat $Q_{1-2}$ from the first coolant to the second coolant. By design, the first cooling loop 100 is sealed from the environment and from the second cooling loop 200. Similarly, by design, the second cooling loop 200 is sealed from the environment and from the first cooling loop 100.

The first cooling loop 100 includes a heat source 102 configured to transfer heat $Q_1$ to the first coolant; a coolant pump 104; the first side of the heat exchanger 300; an inertial separator 106; a flow restrictor 108; and a fluid conduit 110 interconnecting the heat source 102, the coolant pump 104, the first side of the heat exchanger 300, the inertial separator 106, and the flow restrictor 108. As shown, the heat source 102 is downstream of the flow restrictor 108, which is downstream of the inertial separator 106, which is downstream of the pump 104, which is downstream of the heat exchanger 102.

The inertial separator 106 is shown as a "T" junction or intersection in the fluid conduit 110, as will be discussed further below. In other embodiments, the inertial separator 106 may be a cyclonic separator or any other device that uses fluid momentum to separate fluids having different densities based on the difference in their densities.

The flow restrictor 108 may be an orifice, a series of orifices, a filter, or any other device that substantial restricts fluid flow therethrough or that creates a substantial pressure drop of fluid flowing therethrough.

The portion of the first cooling loop 100 downstream of the flow restrictor 108 and upstream of the pump 104 may be referred to herein as the low-pressure side of the first cooling loop 100. The portion of the first cooling loop 100 downstream of the pump 104 and upstream of the flow restrictor 108 may be referred to herein as the high-pressure side of the first cooling loop 100. As such, the first side of the heat exchanger 300 and the inertial separator 106, and the flow restrictor 108 are located on the high-pressure side of the first cooling loop 100, and the heat source 102 is located on the low-pressure side of the first cooling loop 100.

As shown, the first cooling loop 100 also includes a coolant tank (or reservoir or accumulator) 112 fluidly connected via the first conduit 110 to the low-pressure side of the first cooling loop. The coolant tank 112 defines a liquid space 112L configured to hold liquid first coolant, a gas space 112G configured to hold coolant vapor or other gases, and an interface I between the liquid space 112L and the gas space 112G. Such coolant vapor may include first coolant vapor or second coolant vapor, as will be discussed further below. The liquid space 112L, the gas space 112G, and the location of the interface I are not rigidly defined.

The liquid space 112L, the gas space 112G, and the location of the interface I may vary depending on coolant level, the orientation of the cooling system 10, and inertial loads placed on the first coolant. For example, the coolant level may vary based on fill level of the first coolant and thermal expansion and contraction of the first coolant. Also, with the cooling system 10 installed in an aircraft or other vehicle, the orientation of the cooling system 10 may vary as a function of the orientation of the aircraft or other vehicle. Further, the orientation of the first coolant and the interface I in the coolant tank 112 may vary as a function of inertial loads placed on the first coolant, for example, due to acceleration of the vehicle in which the cooling system 10 is installed.

The first cooling loop 100 further includes a heat source bypass pressure relief valve 114 having an inlet fluidly connected to the inertial separator 106, and an outlet fluidly connected to the coolant tank 112. In some embodiments, the outlet of the heat source bypass pressure relief valve 114 is fluidly connected to the gas space of the coolant tank 112. In other embodiments, the outlet of the heat source bypass pressure relief valve 114 may be fluidly coupled to another portion of the low-pressure side of the first cooling loop, for example, to the fluid conduit 110 between the heat source 102 and the pump 104. In further embodiments, the outlet of the heat source bypass pressure relief valve 114 may be vented to the atmosphere or another environment.

As shown, the first cooling loop 100 may also include a coolant tank pressure relief valve 116 having an inlet fluid connected to the gas space 112G of the coolant tank 112 and an outlet. The outlet of the coolant tank pressure relief valve 116 may be fluidly connected to a capture vessel 118. The capture vessel 118 may be a rigid tank or an expandable vessel, for example, an expandable balloon. Alternatively, the outlet of the coolant tank pressure relief valve 116 may be fluidly connected to the atmosphere or another environment.

The first cooling loop 100 may further include a first pressure sensor 120 configured to detect and output a signal indicative of a pressure of the low-pressure side of first cooling loop 100. As shown, the first pressure sensor 120 may be fluidly connected to the first conduit 110. Alternatively, the first pressure sensor 120 may be fluidly connected to the coolant tank 112 or otherwise to the low-pressure side of the first cooling loop 100. The output of the first pressure sensor 120 may be coupled to a controller C. The controller C may be configured to regulate the operation of the heat source 102 to reduce the input of heat $Q_1$ from the heat source 102 into the first coolant. In some embodiments, the controller C may be configured to output a signal indicative of a system low-volume leak. In some embodiments, the first pressure sensor 120 could be configured to detect and output a signal indicative of a pressure of the high-pressure side of first cooling loop 100.

In embodiments including the capture vessel 118, the first cooling loop 100 may also include a second pressure sensor 122 fluidly connected to the capture vessel 118 and configured to detect and output a signal indicative of pressure within the capture vessel 118.

The second cooling loop 200 includes a second fluid conduit 210 and the second side of the heat exchanger 300. The second coolant is configured to move through the second fluid conduit 210. Accordingly, the heat exchanger 300 is in fluid communication with the first fluid conduit 110 and the second fluid conduit 210. The second cooling loop 200 also may include a second heat exchanger 202 configured to reject heat $Q_2$ from the second coolant to an environment outside the second cooling loop 200.

The first cooling loop 100 is configured to operate at a first nominal temperature and pressure. The first coolant is configured to be in a liquid state at the first nominal temperature and pressure. The second cooling loop 200 is configured to operate at a second nominal temperature and pressure. The second coolant is configured to be in a liquid state at the second nominal temperature and pressure, and to be in a vapor state at the first nominal temperature and pressure. The second nominal pressure is substantially greater than the first nominal pressure. As such, the second coolant may migrate from the second cooling loop 200 into the first cooling loop 100 in the event of a leak between the first side of the heat exchanger 300 and the second side of the heat exchanger 300.

In the event that second coolant migrates from the second cooling loop 200 into the first cooling loop 100, the second coolant that has migrated into the first coolant loop 100 is expected to change state from the liquid state to the vapor state, and to increase the pressure in the first cooling loop 100. In some scenarios, the vaporized second coolant may increase the pressure in the first cooling loop 100 to a pressure exceeding the design pressure of the first cooling loop 100. Such a pressure increase in the first cooling loop 100 may compromise the structural integrity of components in the first cooling loop 100. For example, the heat source 102 may include an internal first coolant pressure boundary that is susceptible to damage or failure if subjected to excessive pressure.

Also, the presence of vaporized second coolant (or other vapor) in the first cooling loop 100 may limit or otherwise compromise the ability of the first coolant to receive heat from the heat source 102. Further, the presence of vaporized second coolant (or other vapor) in the first cooling loop 100 may adversely affect electrical isolation of components in the first cooling loop 100. For example, the heat source 102 may be a generator cooled by the first coolant, wherein the first coolant also serves as a dielectric between internal electrical components of the generator. Vaporized second coolant may have a substantially lower dielectric constant than the first coolant. As such, the presence of vaporized second coolant in the first cooling loop 100 may substantially reduce the electrical isolation between the electrical components of the generator.

To mitigate the foregoing deleterious effects, the first cooling loop 100 is configured and operable to separate vapor in the first coolant loop 100 from the liquid first coolant upstream of the heat source 102, as will be discussed further below.

With the cooling system 10 in use, as suggested above, the first cooling loop 100 operates at the first nominal pressure, and the second cooling loop 200 operates at the second nominal pressure. The second nominal pressure is substantially higher than the first nominal pressure.

The first nominal pressure includes a relatively low first pressure on the low-pressure side of the first cooling loop 100, and a relatively high first pressure on the high-pressure side of the first cooling loop 100. Under normal operating conditions, the difference between the relatively low first pressure and the relatively high first pressure may be expressed as a first differential pressure.

In the event that a leak were to develop between the first cooling loop 100 and the second cooling loop 200, a portion of the second coolant would migrate from the second cooling loop 200 into the first cooling loop 100 because the second pressure is substantially higher than the first pressure.

As discussed above, the second coolant is configured to be in a liquid state at the second nominal temperature and pressure, and to be in a vapor state at the first nominal temperature and pressure. As such, when the second coolant migrates from the second cooling loop into the first cooling loop, the second coolant expands and changes state from liquid to vapor.

The presence of the second coolant vapor in the first coolant impairs flow of the first coolant and second coolant vapor entrained in the first coolant through the flow restrictor 108. This impaired flow causes the pressure upstream of the flow restrictor 108 to rise, without causing a similar rise in pressure on the low-pressure side of the first cooling loop 100, thereby causing the first differential pressure to increase.

Should the first differential pressure increase to a pressure value in excess of the heat source bypass pressure relief valve 114 setpoint, the heat source bypass pressure relief valve 114 opens. With the heat source bypass pressure relief valve 114 open, the inertial separator 106 diverts the second coolant vapor from the liquid first coolant. More specifically, in the embodiment shown, inertia causes the liquid first coolant flowing into the T-junction 106 to continue to flow through and flow out of the T-junction 106 without substantially changing direction. The second coolant vapor, however, tends to turn out of the first coolant flow path within the T-junction 106 and towards and through the open heat source bypass pressure relief valve 114 and into the coolant tank 112. This phenomenon occurs because the vaporized second coolant (because it is in gaseous form) has substantially less mass than the first coolant, and because the pressure in the coolant tank 112 is lower than the pressure at the entry of the flow restrictor 108.

The second coolant vapor diverted to the coolant tank 112 causes the pressure on the low-pressure side of the first cooling loop 100 to rise. This pressure may be monitored by the first pressure sensor 120. Should this pressure increase to a pressure value in excess of the coolant tank pressure relief valve 116 setpoint, the coolant tank pressure relief valve 116 opens, thereby allowing the second coolant vapor (and/or other gas present in the coolant tank 112) to move to the capture vessel 118 (or to be vented to the environment if no capture vessel is provided). The controller C may be configured to output a signal indicative of a system low-volume leak under these circumstances. The pressure in the capture vessel 118 may be monitored by the second pressure sensor 122. Should the pressure in the capture vessel 118 exceed a predetermined pressure value, the capture vessel 118 may be selectively vented to the environment through a further pressure relief valve or other valve (not shown). The controller C may be configured to output a system high-volume leak warning under these circumstances.

Figure 3:
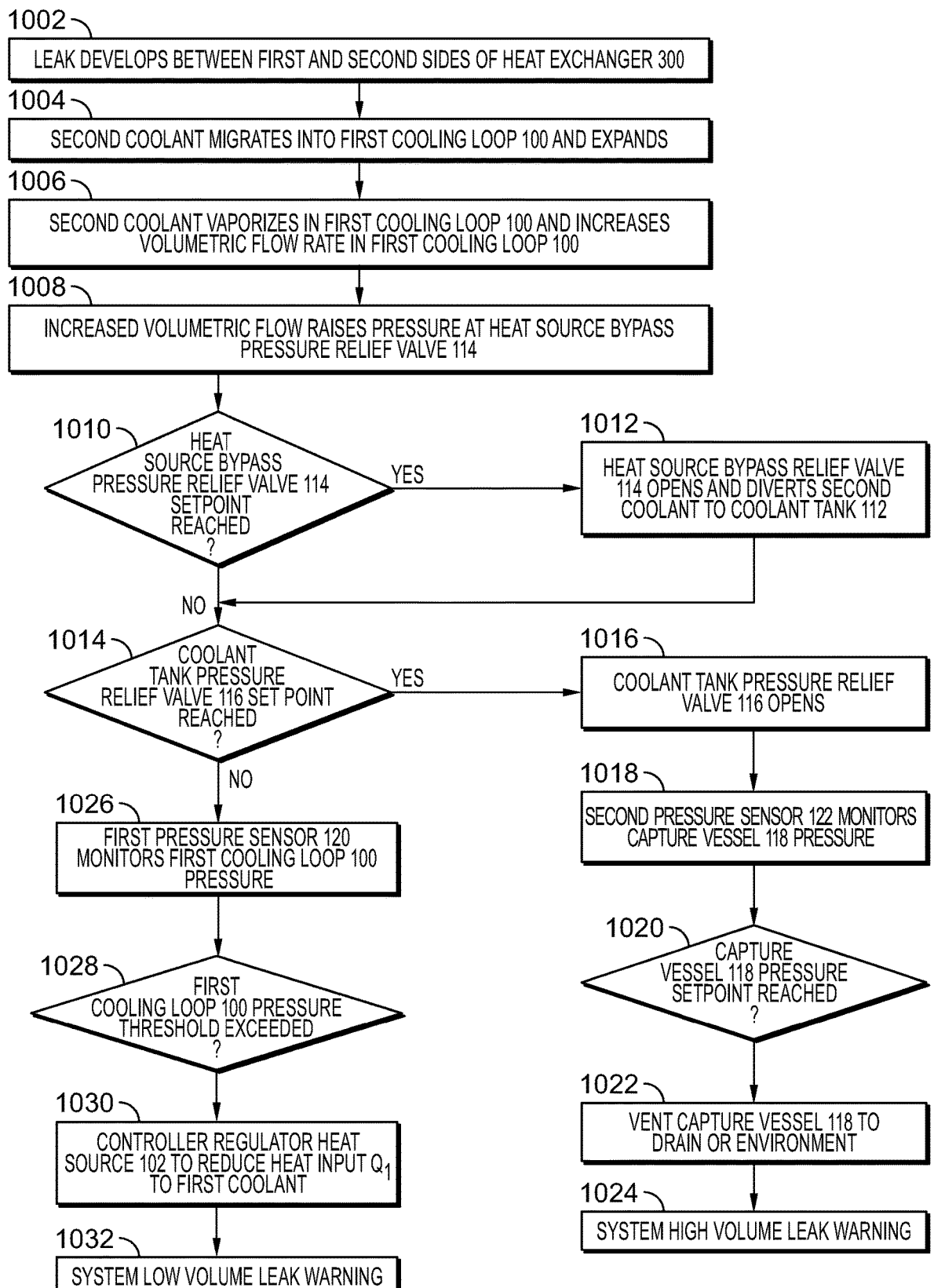
FIG. 3 is a flow chart showing a method of operating the cooling system of FIG. 1 to separate second coolant vapor that may be present in the first cooling loop from the first coolant.

FIG. 3 illustrates a method of removing vaporized second coolant that has migrated from the second coolant loop 200 into the first cooling loop 100.

At Step 1002, a leak develops between the first and second sides of the heat exchanger 300.

At Step 1004, second coolant leaks from the second cooling loop 200 into the first cooling loop 100 and expands.

At Step 1006, the second coolant that leaked into the first cooling loop 100 vaporizes and increases the volumetric flow rate in the first cooling loop 100.

At Step 1008, the increased volumetric flow rate in the first cooling loop 100 causes the pressure upstream of the flow restrictor 108 and the heat source bypass pressure relief valve 114 to rise.

At Step 1010, the heat source bypass pressure relief valve 114 opens if the pressure upstream of the flow restrictor 108 and the heat source bypass pressure relief valve 114 has risen beyond the heat source bypass pressure relief valve 114 setpoint, or the heat source bypass pressure relief valve 114 remains closed if the pressure upstream of the flow restrictor 108 and the heat source bypass pressure relief valve 114 has not risen beyond the heat source bypass pressure relief valve setpoint.

At Step 1012, with the heat source bypass pressure relief valve 114 open, vaporized second coolant moves through the inertial separator 106 to the coolant tank 112, and liquid first coolant moves through the inertial separator 106 to the flow restrictor 108.

At Step 1014, the coolant tank pressure relief valve 116 opens if the coolant tank 112 pressure has risen beyond the coolant tank pressure relief valve 116 setpoint, or the coolant tank pressure relief valve 116 remains closed if the coolant tank 112 pressure has not risen beyond the coolant tank pressure relief valve 116 setpoint.

At Step 1016, with coolant tank pressure relief valve 116 open, second coolant vapor or other pressurized gas in the coolant tank 112 moves to the capture vessel 118 or to a drain or the environment if no capture vessel is provided.

At Step 1018, the second pressure sensor 122 monitors the pressure within the capture vessel 118.

At Steps 1020 and 1022, the capture vessel 118 is isolated if the capture vessel 118 pressure is at or below a predetermined value, and the capture vessel 118 is vented to a drain or the environment if the capture vessel 118 pressure is exceeds the predetermined value.

At Steps 1024, the controller C outputs a system high-volume leak warning.

At Step 1026, the first pressure sensor 120 monitors pressure in the first cooling loop 100.

At Steps 1028 and 1030, a controller C regulates the operation of the heat source 102 to reduce the input of heat $Q_1$ from the heat source to the first coolant if the pressure in the low-pressure side of first cooling loop 100 exceeds a threshold value.

At Step 1032, the controller C outputs a system low-volume leak warning.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A cooling system including a vapor leak diversion system,
    the cooling system comprising:
    a first sealed cooling loop configured to operate at a first nominal working pressure, the first sealed cooling loop comprising:
        a first fluid conduit;
        a first coolant configured to circulate through the first fluid conduit, wherein the first coolant is a liquid at the first nominal working pressure;
        a pump configured to circulate the first coolant through the first fluid conduit; and
        a heat source configured to transfer heat to the first coolant;
    a second sealed cooling loop configured to operate at a second nominal working pressure greater than the first nominal working pressure, the second sealed cooling loop comprising:
        a second fluid conduit;
        a second coolant configured to circulate through the second fluid conduit, wherein at least a portion of the second coolant is a liquid at the second nominal working pressure and wherein the second coolant is a vapor at the first nominal working pressure; and
    a heat exchanger in fluid communication with the first sealed cooling loop and the second sealed cooling loop, the heat exchanger configured to exchange heat between the first sealed cooling loop and the second sealed cooling loop;
    the first sealed cooling loop further comprising:
    a coolant tank in fluid communication with the low-pressure side of the first sealed cooling loop, the coolant tank having a gas space configured to hold gas and a liquid space configured to hold a portion of the first coolant;
    an inertial separator located between the heat exchanger and the heat source, the inertial separator configured to separate vapor from the first coolant;
    a flow restrictor located between the inertial separator and the heat source; and
    a heat source bypass pressure relief valve having an inlet in fluid communication with the inertial liquid and vapor separator and an outlet in fluid communication with the coolant tank, wherein the heat source bypass pressure relief valve is configured to open when a differential pressure between the inlet and the outlet of the heat source bypass pressure relief valve exceeds a first predetermined value;
    wherein the flow restrictor and the pump cooperate to define a high-pressure side of the first cooling loop and a low-pressure side of the first sealed cooling loop.

2. The cooling system of claim 1, wherein the presence of vapor in the first fluid conduit between the heat exchanger and the flow restrictor results in an increase in the differential pressure between the inlet and the outlet of the heat source bypass pressure relief valve greater than the predetermined value.

3. The cooling system of claim 2, wherein the inertial separator directs the first coolant to the heat source and diverts the vapor to the coolant tank through the heat source bypass pressure relief valve.

4. The cooling system of claim 3, wherein the inertial separator is a T-junction in the first fluid conduit.

5. The cooling system of claim 1, wherein the second sealed cooling loop is a two-phase cooling loop, and wherein the second coolant is a two-phase fluid at the second nominal working pressure.

6. The cooling system of claim 1, further comprising a tank pressure relief valve having an inlet in fluid communication with the gas space of the coolant tank, wherein the tank pressure relief valve is configured to open when a differential pressure between the inlet and the outlet of the tank pressure relief valve exceeds a second predetermined value, wherein the second predetermined value is greater than the first predetermined value.

7. The cooling system of claim 6, wherein the tank pressure relief valve has an outlet in fluid communication with a capture vessel.

8. The cooling system of claim 7, wherein the capture vessel is an expandable vessel.

9. The cooling system of claim 7, further comprising a vent system configured to vent the capture vessel if the pressure inside the capture vessel exceeds a predetermined value.

10. The cooling system of claim 1, further comprising a pressure sensor configured to detect and output a signal indicative of pressure in the first sealed cooling loop, and a controller configured to receive the signal and to regulate the operation of the heat source to reduce heat input to the first coolant when the pressure in the first sealed cooling loop exceeds a threshold value.

11. A cooling system including a vapor leak diversion system, the cooling system comprising:
a first sealed cooling loop including a first fluid conduit, a first coolant, a pump configured to move the first coolant through the first fluid conduit, and a heat source configured to transfer heat to the first coolant;
a second sealed cooling loop that includes a second fluid conduit and a second coolant configured to move through the second fluid conduit;
a heat exchanger in fluid communication with the first fluid conduit and the second fluid conduit and configured to exchange heat between the first coolant and to the second coolant,
wherein a working pressure and temperature of the first sealed cooling loop is such that the first coolant is in a liquid state in the first sealed cooling loop,
wherein a working pressure and temperature of the second sealed cooling loop is such that the second coolant is in a liquid state in the second sealed cooling loop,
wherein the second coolant is configured to change from the liquid state to a vapor state if the second coolant enters the first sealed cooling loop, and
wherein the first sealed cooling loop further includes:
a flow restrictor fluidly connected downstream of the heat exchanger and upstream of the heat source, and
an inertial separator fluidly connected downstream of the heat exchanger and upstream of the flow restrictor, wherein the inertial separator is configured to separate vaporized second coolant located in the first sealed cooling loop from the first coolant in response to the vaporized second coolant located in the first fluid conduit interacting with the flow restrictor to cause a differential pressure in the first sealed cooling loop between an upstream side of the heat source and a downstream side of the heat source to exceed a predetermined value.

12. The cooling system of claim 11, further comprising a pressure relief valve having an inlet in fluid communication with the inertial separator and an outlet in fluid communication with the first fluid conduit downstream of the heat source and upstream of the heat exchanger.

13. The cooling system of claim 12, further comprising a coolant tank in fluid communication with the first fluid conduit downstream of the heat source and upstream of the heat exchanger, the coolant tank defining a gas space configured to hold gas and a liquid space configured to hold the first coolant, wherein the outlet of the pressure relief valve is fluidly coupled to the gas space.

14. The cooling system of claim 13, further comprising a pressure relief valve having an inlet fluidly coupled to the gas space and an outlet fluidly coupled to an environment.

15. The cooling system of claim 13, wherein the pressure relief valve has an outlet fluidly coupled to a capture vessel.

16. The cooling system of claim 12, further comprising a pressure sensor configured to detect and output a signal indicative of pressure in the first sealed cooling loop, and a controller configured to receive the signal and to output a signal indicative of a leak in the second sealed cooling loop if the pressure in the first sealed cooling loop exceeds a threshold value.

\* \* \* \* \*